(12) United States Patent
Zhu et al.

(10) Patent No.: US 11,447,640 B2
(45) Date of Patent: Sep. 20, 2022

(54) ENCAPSULATED MATERIALS WITH IMPROVED PROPERTIES

(71) Applicant: SUN CHEMICAL CORPORATION, Parsippany, NJ (US)

(72) Inventors: Xiaobo Zhu, Nutley, NJ (US); Juanita Parris, Montvale, NJ (US); Ralph Arcurio, Bridgewater, NJ (US); Mohammad S. Farahat, Wyckoff, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 854 days.

(21) Appl. No.: 16/325,905

(22) PCT Filed: Aug. 17, 2017

(86) PCT No.: PCT/US2017/047347
§ 371 (c)(1),
(2) Date: Feb. 15, 2019

(87) PCT Pub. No.: WO2018/035325
PCT Pub. Date: Feb. 22, 2018

(65) Prior Publication Data
US 2021/0214561 A1    Jul. 15, 2021

Related U.S. Application Data

(60) Provisional application No. 62/376,608, filed on Aug. 18, 2016.

(51) Int. Cl.
*C09B 67/02* (2006.01)
*C08F 2/22* (2006.01)
(Continued)

(52) U.S. Cl.
CPC ............ *C09B 67/0097* (2013.01); *C08F 2/22* (2013.01); *C08F 12/08* (2013.01); *C08F 20/14* (2013.01);
(Continued)

(58) Field of Classification Search
None
See application file for complete search history.

(56) References Cited

U.S. PATENT DOCUMENTS 5,500,286 A    3/1996  Someya et al.
7,176,255 B2   2/2007  Mathauer et al.
(Continued)

FOREIGN PATENT DOCUMENTS

CN    105693906      6/2016
EP    1 331 253 B1   8/2013
(Continued)

OTHER PUBLICATIONS

Japanese Office Action dated Mar. 8, 2021 in counterpart Japanese Patent Application No. 2019-509549 and language translation thereof.
(Continued)

*Primary Examiner* — Jeffrey D Washville
(74) *Attorney, Agent, or Firm* — Marian E. Fundytus; Ostrolenk Faber LLP (57) ABSTRACT

Described herein are polymer-encapsulated materials and a method for encapsulating materials with polymer via emulsion polymerization. The encapsulated materials include colorants (e.g., pigments and dyes, and in particular fluorescent dyes), optical brighteners, downconverters and upconverters. The encapsulated materials are produced by the emulsion polymerization of ethylenically unsaturated monomers. The polymer-encapsulation method described herein does not require the preparation of a miniemulsion homogenized with special equipment, such as an ultrasoni-
(Continued)

fication device, and the resulting polymer-encapsulated materials exhibit optical properties superior to polymer-encapsulated materials prepared by processes that include the preparation of a miniemulsion prepared with such special equipment, such as an ultrasonification device.

20 Claims, 2 Drawing Sheets

(51) Int. Cl.
*C08F 12/08* (2006.01)
*C08F 20/14* (2006.01)
*C08F 212/08* (2006.01)
*C08F 220/14* (2006.01)
*C09B 57/08* (2006.01)
*C09B 57/10* (2006.01)

(52) U.S. Cl.
CPC .......... *C08F 212/08* (2013.01); *C08F 220/14* (2013.01); *C09B 57/08* (2013.01); *C09B 57/10* (2013.01)

(56) References Cited

U.S. PATENT DOCUMENTS

| 9,006,361 | B2 | 4/2015 | Behrens et al. |
| 2005/0075453 | A1 | 4/2005 | Mathauer et al. |
| 2007/0065743 | A1 | 3/2007 | Huang et al. |
| 2007/0227401 | A1 | 10/2007 | Ganschow et al. |
| 2008/0039550 | A1* | 2/2008 | Miyabayashi ............ C09C 3/10 523/200 |
| 2009/0179176 | A1 | 7/2009 | Shibata et al. |
| 2013/0075692 | A1 | 3/2013 | Naasani et al. |
| 2015/0010863 | A1* | 1/2015 | Nabuurs ............... A61K 8/8152 430/109.31 |
| 2015/0041715 | A1 | 2/2015 | Hee et al. |

FOREIGN PATENT DOCUMENTS

| JP | 50-024382 | 3/1975 |
| JP | H09-279073 | 10/1997 |
| JP | 2007-291225 | 11/2007 |
| JP | A2010-229219 | 10/2010 |
| WO | WO 2012/082964 A2 | 6/2012 |

OTHER PUBLICATIONS

International Preliminary Repot on Patentability issued in International Application No. PCT/US2017/047347, dated Feb. 19, 2019.
International Search Report issued in International Application No. PCT/US2017/047347, dated Nov. 13, 2017.
Written Opinion of the International Searching Authority issued in International Application No. PCT/US2017/047347, dated Nov. 13, 2017.
S. Lelu, et al., "*Encapsulation of an Organic Phthalocyanine Blue Pigment Into Polystyrene Latex Particles Using a Miniemulsion Polymerization Process*" Polymer International Polym. Int. 52:542-547 (2003) DOI: 10.1002/pi.1029.
Baier et al. "Fluorescent Conjugated Polymer Nanoparticles by Polymerization in Miniemulsion" Journal of the American Chemical Society, vol. 131 Issue 40 (Sep. 18, 2009): pp. 14267-14273; abstract, p. 14271 col. 1 para 1, fig. 4, fig. 6.
Supplementary European Search Report issued in counterpart EP Application No. 17 84 2122, dated Jan. 15, 2020.

* cited by examiner

ENCAPSULATED MATERIALS WITH IMPROVED PROPERTIES

The present application is a § 371 National Stage application based on PCT/US2017/047347 filed Aug. 17, 2017, which claims priority to U.S. Provisional Patent Application No. 62/376,608, filed Aug. 18, 2016, the subject matter of each of which is incorporated herein by reference in its entirety.

FIELD OF THE INVENTION

Disclosed herein are encapsulated materials such as colorants, more preferably pigments and dyes, even more preferably dyes, and most preferably fluorescent dyes. The materials are encapsulated by the emulsion polymerization processes described herein.

BACKGROUND OF THE INVENTION

Various materials, for example colorants (pigments and dyes e.g. fluorescent dyes), optical brighteners, downconverters and upconverters are commonly used as markers and taggants in inks due to the detectable color that they emit. However, their use requires some extra consideration since, for example, many fluorescent dyes are water insoluble, making it difficult to include them in water-based inks and coatings. Further, molecules of fluorescent dye are known to aggregate together, which causes an unwanted quenching of dye fluorescence.

Many inks that include fluorescent dyes exhibit poor lightfastness, which is particularly problematic when such dyes are included in products having outdoor usage. Further, in view of aggregation, the concentration of fluorescent dyes in ink and coating compositions should be kept low in order to maintain their fluorescence properties. In high dye concentrations, fluorescent dye molecules may aggregate, which can cause quenching of the fluorescent signal.

One approach to overcoming the aforementioned disadvantages is to encapsulate the dye material in a polymer matrix formed in an emulsion polymerization of ethylenically unsaturated monomers. The polymer matrix also serves as a barrier to moisture and oxygen, the exposure to which are believed to be major causes for the fading or degradation of the fluorescent dyes when exposed to light. In the current encapsulation via emulsion polymerization processes, it is necessary to prepare a monomer microemulsion, a/k/a miniemulsion, such as provided for in U.S. Pat. No. 7,176,255 ("the '255 patent"), in which among other components, water, surfactant, dye, and ethylenically unsaturated monomer are prepared in a dye-comprising monomer emulsion and then subjected to a homogenizing ultrasound process that produces the miniemulsion. See, e.g., the '255 patent at col. 50.

Other references further provide for producing dye emulsions using homogenizers such as the high speed Ultra-Turrax homogenizer. See, e.g., U.S. Pat. No. 9,006,361 ("the '361 patent") and S. Lelu, et. al, "*Encapsulation of an Organic Phthalocyanine Blue Pigment Into Polystyrene Latex Particles Using a Miniemulsion Polymerization Process*" Polymer International Polym. Int. 52:542-547 (2003) DOI: 10.1002/pi.1029. The '361 patent and the '255 patent report that coagulum and precipitate is produced in the polymerization. The '255 patent reports that dye precipitates out of the emulsion. This suggests that the resulting emulsions that include polymer-encapsulated dyes are not very stable.

The '255 patent indicates that the process of free-radical aqueous emulsion polymerization described therein uses an oil-in-water monomer emulsion in which monomers contain the dye in dissolved form and that the monomer droplets essentially have a diameter of <500 nm. The '255 patent further states that conventional emulsion polymerization, on the other hand, is unsuccessful, apparently because:

"In conventional emulsion polymerization techniques, in contradistinction to the process of the ['255 patent], the monomer droplets in the polymerization vessel generally have diameters above 1000 nm. The failure of conventional emulsion polymerization in the preparation of dye-comprising polymers can probably be attributed to the fact that in conventional emulsion polymerization the monomer droplets serve solely as a reservoir for the polymers to be polymerized while the actual polymerization reaction takes place in the aqueous dispersion medium or on the polymer particles that are formed in the course of the polymerization. In that case, the monomers, which generally have a certain solubility in water, diffuse from the monomer droplets to the centers of polymerization . . . . The dye, on the other hand, which does not generally possess sufficient solubility in water, remains in the monomer droplets; homogeneous incorporation of the dyes into the polymer particles is therefore not guaranteed. In contradistinction to the course of polymerization sketched out above, it is presumed that in the process of the ['255 patent] the polymerization takes place in the monomer droplets. There is therefore homogeneous incorporation of the dyes into the polymeric matrix". See the '255 patent, col. 2 lines 54-62 and col. 3 lines 5-32. As understood from the '255 patent disclosure, the "homogeneous incorporation" is apparently is attributable to the prepared miniemulsion described in the '255 patent.

The need to practice the miniemulsion homogenizing step and to use specialized equipment to carry out this step adds to the complexity of the process of the '255 patent. This disadvantage is shared by other processes that perform this step.

Further, in the process of the '255 patent, polymer coagulum is reported as forming after the polymerization, which suggests that there are stability issues with the encapsulated dye emulsion.

EP 1 331 253 may also be of interest.

SUMMARY OF THE INVENTION

Described herein are polymer-encapsulated materials and a method for encapsulating materials with polymer via emulsion polymerization. The encapsulated materials include colorants (e.g., pigments and dyes, and in particular fluorescent dyes), optical brighteners, downconverters and upconverters. The encapsulated materials are produced by the emulsion polymerization of ethylenically unsaturated monomers. The polymer-encapsulation method described herein does not require the preparation of a miniemulsion homogenized with special equipment, such as an ultrasonification device, and the resulting polymer-encapsulated materials exhibit optical properties superior to polymer-encapsulated materials prepared by processes that include the preparation of a miniemulsion prepared with special equipment such as an ultrasonification device.

The superior optical properties include the intensity of the polymer-encapsulated materials at a specified wavelength, as will be described herein.

In one inventive aspect, disclosed herein is an encapsulated light emitting material comprising a light emitting material and a polymer material encapsulating the light emitting material, wherein the encapsulated light emitting material exhibits an increased intensity of at least 5% over encapsulated light emitting materials made by other processes. In another inventive aspect, those other processes include milling and spray drying.

In one aspect, the present disclosure describes an encapsulated light emitting material comprising a light emitting material and a polymer material encapsulating the light emitting material, wherein the encapsulated light emitting material exhibits an increased intensity of at least 5% over an encapsulated light emitting material produced in an emulsion polymerization that employs a miniemulsion procedure.

In one aspect, the light emitting material is a colorant, for example, a dye or a pigment. In one particular aspect, the light emitting material is a fluorescent dye.

In another aspect, the encapsulated light emitting material is produced in an emulsion polymerization that does not employ a miniemulsion procedure.

In still another aspect, the intensity comparison between the present encapsulated light emitting material and the encapsulated light emitting material produced in an emulsion polymerization that employs a miniemulsion procedure is made at a wavelength corresponding to the peak intensity of a mixture of N-methyl pyrrolidone (NMP) and the light emitting material.

In one aspect, the polymer material is produced from ethylenically unsaturated monomers. In another aspect, the polymer material is a homopolymer, for example one produced from a single ethylenically unsaturated monomer species. In another aspect, the polymer material is a copolymer, for example, one produced from two or more different ethylenically unsaturated monomers.

The method of providing a polymer-encapsulated material comprises the steps of: (a) dissolving one or more cationic or anionic surfactants, and possibly, one or more non-ionic surfactants, in water; (b) dissolving a material to be encapsulated in a polymerizable or non-polymerizable solvent or in a solvent blend comprised of two or more polymerizable or non-polymerizable solvents; (c) combining (a) and (b) together with one or more non-ionic surfactants, if the non-ionic surfactants has not been added to (a), and mixing same; (d) adding one or more monomers polymerizable by free radical polymerization to the above-mixture; and (e) adding one or more initiators at any step of the process, and initiating a free radical polymerization reaction in the aqueous medium, wherein in an emulsion, the material of (b) is encapsulated in the polymer material that forms in the polymerization reaction.

Steps (a) and (b) may be performed in any order (e.g., step (a) may be performed first or step (b) may be performed first).

It is preferred that the step (b) solution and the step (a) solution be added together with stirring, followed by adding one or more non-ionic surfactants.

The one or more cationic or anionic surfactants of step (a) may be monomeric or polymeric.

Preferably, the one or more initiators are added before step (d). More preferably, the mixture including the one or more initiators is held for at least 5 minutes before adding the monomers in step (d). However, the initiators may be added before step (d) at any time, or they may be added in step (e). Preferably, the initiator(s) are added to the mixture as aqueous initiator solutions.

In another inventive aspect, described herein is an encapsulated light emitting material comprising a light emitting material and a polymer material encapsulating the light emitting material produced according to the method(s) described herein.

In yet another inventive aspect, described herein is an encapsulated light emitting material comprising a light emitting material and a polymer material encapsulating the light emitting material produced according to a method comprising the steps of: (a) dissolving one or more cationic or anionic surfactants, and possibly, one or more non-ionic surfactants, in water; (b) dissolving a material to be encapsulated in a polymerizable or non-polymerizable solvent or in a solvent blend comprised of two or more polymerizable or non-polymerizable solvents; (c) combining (a) and (b) together with one or more non-ionic surfactants, if the non-ionic surfactants has not been added to (a), and mixing same; (d) adding one or more monomers polymerizable by free radical polymerization to the above-mixture; and (e) adding one or more initiators at any step of the process, and initiating a free radical polymerization reaction in the aqueous medium, wherein in an emulsion, the material of (b) is encapsulated in the polymer material that forms in the polymerization reaction.

When the monomers are added to the mixture, it is preferred that they be added slowly thereto, e.g., a rate of about 5 g/min or less, more preferably, 4 g/min or less, even more preferably 3 g/min or less, even still more preferably 2 g/min or less; yet even still more preferably 1 g/min or less, and even yet still more preferably, 0.5 g/min or less.

In one aspect, the polymer material is produced from ethylenically unsaturated monomers. In another aspect, the polymer material is a homopolymer. In another aspect, the polymer material is a copolymer.

In one aspect, the material to be encapsulated is a colorant, such as pigments and dyes, optical brighteners, down-converters, and upconverters. In a particular aspect, the material to be encapsulated is a fluorescent dye.

The inventors have surprisingly found that by preparing a mixture of one or more solvents and material to be encapsulated (e.g., a fluorescent dye) in order to dissolve the latter in the former leads to the formation of a stable emulsion in which the material is encapsulated in polymer. The material to be encapsulated, which may exhibit poor solubility in water, is aided by the step of dissolving same in the solvent. What results is a stable dispersion in which the material is inhibited or prevented from precipitating and aggregating after polymerization.

The one or more solvents used to dissolve the material to be encapsulated may be polymerizable, non-polymerizable, and combinations thereof. N-vinyl pyrrolidone is an example of a polymerizable solvent, as it is ethylenically unsaturated. Other polymerizable solvents, such as ethylenically unsaturated solvents, may be employed in the present method.

In a preferred aspect, the particle sizes of the materials encapsulated in polymers in the aqueous polymerization emulsions, such as encapsulated fluorescent dye particles, are preferably between 50 nm to 500 nm. Such encapsulated particles can be attained by polymerizing ethylenically unsaturated monomers in the presence of the fluorescent dye particles according to the methods described herein. Notably, the '255 patent indicates that monomer particle sizes less than 1000 nm and less than 500 nm were not obtainable unless a homogenized miniemulsion was prepared and used in the encapsulation process.

One of the benefits of the present method is that it is effective for materials exhibiting poor solubility in ethylenically unsaturated monomers such as styrenes and acrylates.

In the case of colorant materials, such as pigments and dyes, and in particular fluorescent dyes, the emulsions containing the polymer-encapsulated materials are stable and the encapsulated dyes exhibit improved lightfastness when compared to colorants that dispersed into aqueous solution or water based ink.

It is preferred that a polymeric surfactant be included in the emulsion polymerization medium. It has been found that the inclusion of this kind of surfactant provides for a better dispersion of the materials, thereby minimizing the possibility that the polymerized materials will aggregate and/or precipitate. It is further preferred that the polymeric surfactant be an ionic polymeric surfactant. In one aspect of the present disclosure, the solid polymer content present in the emulsions after polymerization is about 5 wt % to 70 wt % based on dried polymer weight to total emulsion weight. The weight percent of encapsulated light-emitting materials, such as dye particles, to the solid polymer in the emulsion is preferably in the range of 0.001 wt % to 1.0 wt %.

In one aspect of the present disclosure, a crosslinking material such as a crosslinking monomer is included in the emulsion polymerization, in order to produce a polymer-encapsulated material having a more extensive network of crosslinks. In a particular aspect, the crosslinking agent is a monomer having two or more ethylenically unsaturated groups per monomer molecule, for example, divinyl monomers and diacrylate monomers. The inclusion of such crosslinking agents produces polymer-encapsulated particles in the emulsion with partial or full crosslink networks. The more extensive network of crosslinks increases solvent resistance when the emulsion is dried and exposed to solvents.

The polymer encapsulated light emitting materials produced in the emulsion polymerization described herein maintain their fluorescent properties. While not wishing to be bound by any theory, this is may be due to the elimination of or the decrease of dye particle aggregation that occurs when the particles are encapsulated. Further, the encapsulation protects the particles, believed to be evidenced by improved lightfastedness. This is particularly the case with polymer-encapsulated fluorescent dyes, which maintain their fluorescent properties. The fluorescent dyes exhibit superior lightfastness when compared to free dyes mixed with the emulsion.

Applicants have further found that the polymer encapsulated light emitting materials of the present disclosure, which are produced by a process that does not include the preparation and use of a homogenizing miniemulsion, are superior to polymer encapsulated light emitting materials produced by a process that includes the preparation and use of a homogenizing miniemulsion.

In one aspect, the encapsulated light emitting material exhibits an intensity increase of at least 5% over an encapsulated light emitting material produced in an emulsion polymerization that employs a miniemulsion procedure, at the peak wavelength exhibited for that light emitting material dissolved in NMP ("at said peak wavelength"). In another aspect, the encapsulated light emitting material exhibits an intensity increase of at least 10% over an encapsulated light emitting material produced in an emulsion polymerization that employs a miniemulsion procedure, at said peak wavelength. In yet another aspect, the encapsulated light emitting material exhibits an intensity increase of at least 15% over an encapsulated light emitting material produced in an emulsion polymerization that employs a miniemulsion procedure at said peak wavelength. In still another aspect, the encapsulated light emitting material exhibits an intensity increase of at least 20% over an encapsulated light emitting material produced in an emulsion polymerization that employs a miniemulsion procedure at said peak wavelength. In even still another aspect, the encapsulated light emitting material exhibits an intensity increase of at least 25% over an encapsulated light emitting material produced in an emulsion polymerization that employs a miniemulsion procedure at said peak wavelength.

As shown herein, the polymer encapsulated light emitting material of the present disclosure exhibits an intensity superior to that of the same polymer encapsulated light emitting material produced in accordance with the teachings of the '255 patent, at the peak wavelength exhibited for that light emitting material dissolved in NMP. As indicated, dye precipitation is a problem encountered in currently known emulsion polymerization processes in which a material is encapsulated by a polymer material. By way of example, a dye may not be fully encapsulated in the emulsion polymerization; thus it precipitates, for example, on the shaft of the agitator, on the temperature probe, and on the walls of the reaction flask. Precipitated dyes may clog the filter membrane during filtration. In contrast, in the present inventive method, in which homogenous polymer-encapsulated materials are produced, minimal or no precipitation of dye material results.

The polymer-encapsulated materials described herein may be used as additives in inks and coating that are used for printing on various substrates to produce light emission when excited by an excitation light source of suitable wavelength. Such inks and coatings would be intended as for use in products that produce the desired light emission for visual detection or machine detection, such as in authentication and/or authorization systems.

BRIEF DESCRIPTION OF THE FIGURES

FIG. 1 represents the normalized intensity level for each sample, as calculated by the ratio of the fluorescence intensity at the peak wavelength at a given irradiation time, to the same intensity before the start of the irradiation process, as described below. FIG. 1 shows that encapsulated pigment blue 79 in crosslinked PS emulsion has better lightfastness than the free pigment blue 79 mixed with OPV. In testing, most of the free dye decayed within the first 5 mins. About 70% of the free Pigment Blue 79 in OPV was degraded after exposing in the light box for 5 minutes, but the encapsulated Pigment Blue 79 still has about 60% remaining intact. The light box is an Atlas Suntest CPS+ Xenon irradiation unit employed in light induced degradation experiments. Drawdown samples of dye in OPV and of emulsions including polymer-encapsulated dyes were placed inside the CPS+ chamber and irradiated for the designated length of time under one Sun equivalent light intensity produced by the light box under normal operating conditions as described by its manufacturer.

DETAILED DESCRIPTION OF THE INVENTION

Described herein are polymer-encapsulated materials and a method for encapsulating materials with polymer via emulsion polymerization. The encapsulated materials include colorants (e.g., pigments and dyes, and in particular fluorescent dyes), optical brighteners, downconverters and upconverters. The encapsulated materials are produced by the emulsion polymerization of ethylenically unsaturated monomers. The polymer-encapsulation method described herein does not require the preparation of a miniemulsion homogenized with special equipment, such as an ultrasonification device, and the resulting polymer-encapsulated materials exhibit optical properties superior to polymer-encapsulated materials prepared by processes that include the preparation of a miniemulsion prepared with such special equipment, such as an ultrasonification device.

In one aspect, the present disclosure describes an encapsulated light emitting material comprising a light emitting material and a polymer encapsulating the light emitting material, wherein the encapsulated light emitting material exhibits an increased intensity of at least 5% over an encapsulated light emitting material produced in an emulsion polymerization that employs a miniemulsion procedure.

In one aspect, the light emitting material is a colorant, for example, a dye or a pigment. In one particular aspect, the light emitting material is a fluorescent dye.

In another aspect, the encapsulated light emitting material is produced in an emulsion polymerization that does not employ a miniemulsion procedure.

In still another aspect, the intensity comparison between the present encapsulated light emitting material and the encapsulated light emitting material produced in an emulsion polymerization that employs a miniemulsion procedure is made at a wavelength corresponding to a peak intensity of a mixture of N-methyl pyrrolidone (NMP) and the light emitting material.

In one inventive aspect, disclosed herein is an encapsulated light emitting material comprising a light emitting material and a polymer material encapsulating the light emitting material, wherein the encapsulated light emitting material exhibits an increased intensity of at least 5% over encapsulated light emitting materials made by other processes. In another inventive aspect, those other processes include milling and spray drying.

The method of providing a polymer-encapsulated material comprises the steps of: (a) dissolving one or more cationic or anionic surfactants, and possibly, one or more non-ionic surfactants, in water; (b) dissolving a material to be encapsulated in a polymerizable or non-polymerizable solvent or in a solvent blend comprised of two or more polymerizable or non-polymerizable solvents; (c) combining (a) and (b) together with one or more non-ionic surfactants, if the non-ionic surfactants has not been added to (a), and mixing same; (d) adding one or more monomers polymerizable by free radical polymerization to the above-mixture; and (e) adding one or more initiators at any step of the process, and initiating a free radical polymerization reaction in the aqueous medium, wherein in an emulsion, the material of (b) is encapsulated in the polymer material that forms in the polymerization reaction.

Steps (a) and (b) may be performed in any order (e.g., step (a) may be performed first or step (b) may be performed first).

It is preferred that the step (b) solution and the step (a) solution be added together with stirring, followed by adding the one or more non-ionic surfactants.

The one or more cationic or anionic surfactants of step (a) may be monomeric or polymeric.

Preferably, the one or more initiators are added before step (d). More preferably, the mixture including the one or more initiators is held for at least 5 minutes before adding the monomers in step (d). However, the one or more initiators may be added before step (d) at any time, or they may be added in step (e). Preferably, the initiators are added to the mixture as aqueous initiator solutions.

In one aspect, the material to be encapsulated is a colorant, such as pigments and dyes, optical brighteners, downconverters, and upconverters. In a particular aspect, the material to be encapsulated is a fluorescent dye.

When the monomers are added to the mixture, it is preferred that they be added slowly thereto, e.g., a rate of about 5 g/min or less, more preferably, 4 g/min or less, even more preferably 3 g/min or less, even still more preferably 2 g/min or less; yet even still more preferably 1 g/min or less, and even yet still more preferably, 0.5 g/min or less.

Preferably, the monomers are ethylenically unsaturated monomers.

In one preferred aspect of the present disclosure, multi-functional monomers, such as di- and tri-functional monomers, may be included in the monomer feed, or added thereafter, as crosslinking agent in order to form cross-linked encapsulated particles in the emulsion.

In one aspect, the encapsulated particles produced by the present method have a size of 50 nm to 500 nm. In another aspect, the emulsion containing the encapsulated materials has a solids content of 5% to 70% (same questions raised above). In yet another aspect, the amount, by weight of the encapsulated dye material to the solid polymer in the emulsion is from 0.001% to 1.0% (same questions as above). In still another aspect, the encapsulated particles may be partially or fully cross-linked, which may aid in increasing solvent resistance when the water in the emulsion is evaporated.

The inventors have surprisingly found that by using at least one solvent in addition to water in order to dissolve the material to be encapsulated (e.g., a fluorescent dye), which may exhibit poor solubility in water, aids in providing a stable dispersion for polymerization in which the material is inhibited or prevented from precipitating and aggregating after polymerization. Preferably, the additional solvent is a water-miscible solvent.

The inventors have surprisingly found that by preparing a mixture of one or more solvents and material to be encapsulated (e.g., a fluorescent dye) in order to dissolve the latter in the former leads to the formation of a stable emulsion in which the material is encapsulated in polymer. The material to be encapsulated, which may exhibit poor solubility in water, is aided by the step of dissolving same in the solvent. What results is a stable dispersion in which the material is inhibited or prevented from precipitating and aggregating after polymerization.

The one or more solvents used to dissolve the material to be encapsulated may be polymerizable, non-polymerizable, and a combination thereof. N-vinyl pyrrolidone is an example of a polymerizable solvent, as it is ethylenically unsaturated. Other polymerizable solvents, such as ethylenically unsaturated solvents, may be employed in the present method.

The solvent used in the present process may dissolve a material such as fluorescent dye that other having poor solubility in water in the aqueous emulsion polymerization medium. The solvent may also aid in dispersing the dye molecules in the medium; prevent the dye from precipitating in the medium, and prevent the encapsulated particles from aggregating after the monomers have polymerized. The resulting polymer-encapsulated fluorescent dye particles in the emulsion exhibit good fluorescence properties and improved lightfastness, compared to free dyes mixed with/ dispersed into the water based emulsion. Water miscible non-polymerizable solvents that can be used to dissolve the dyes include, for example, alcohols, acetates, ketones, acids, and amines. Polymerizable solvents include 1-vinyl-2-pyrrolidinone, acrylic acid, and others. Water miscible non-polymerizable solvents that can be used to dissolve the dyes include, for example, alcohols, acetates, ketones, acids, and amines, such as dimethyl sulfoxide (DMSO), N-methyl pyrrolidone (NMP), and dimethylformamide (DMF), to name a few. The solvents may be used alone or on combinations thereof Materials to be Encapsulated Various materials, for example colorants (pigments and dyes e.g. fluorescent dyes), optical brighteners, downconverters and upconverters may be encapsulated in polymeric material in accordance with the present disclosure. Among those materials are colorants, such as dyes and pigments, and in particular, fluorescent dyes.

Colorants that may be encapsulated in polymer materials in the emulsions described herein include, for example, organic pigments, organic dyes, inorganic pigments and inorganic dyes. Dyes suitable for encapsulation include, for example, fluorescent dyes, azo dyes, anthraquinone dyes, xanthene dyes, azine dyes, and combinations thereof. Organic pigments suitable for encapsulation include, for example, Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4, 79; Pigment Violet Numbers 3, 23, 27; and/or Pigment Green Number 7, and combinations thereof. Inorganic pigments suitable for encapsulation include, for example: iron oxides, titanium dioxides, chromium oxides, ferric ammonium ferrocyanides, ferric oxide blacks, Pigment Black Number 7 and/or Pigment White Numbers 6 and 7, and combinations thereof. Other organic and inorganic pigments and dyes can also be encapsulated by the method described herein, as well as combinations that achieve the colors desired.

Monomers for Polymerization

Suitable monomers that may be used to form the polymeric materials that encapsulate the materials include, for example, ethylenically unsaturated monomers. Suitable ethylenically unsaturated monomers include, for example, (a) monomers such as $C_1$- to $C_{18}$-alkyl esters of acrylic acid, $C_1$- to $C_{18}$-alkyl esters of methacrylic acid, vinyl acetate, vinyl propionate, vinyl butyrate, styrene, chlorostyrene, α-methylstyrene, and combinations thereof; (b) hydrophilic monomers such as, for example, ethylenically unsaturated $C_3$- to $C_6$-carboxylic acids, vinyl sulfonic acid, 2-acrylamido-2-methylpropanesulfonic acid, sulfopropyl acrylate, sulfopropyl methacrylate, styrenesulfonic acid, salts of said acids, acrylonitrile, methacrylonitrile, $C_1$- to $C_8$-hydroxyalkyl esters of $C_1$- to $C_6$-carboxylic acids, di-$C_1$- to $C_3$-alkylamino-$C_2$- to $C_4$-alkyl acrylate, di-$C_1$- to $C_3$-alkylamino-$C_2$- to $C_4$-alkyl methacrylates, acrylamide, methacrylamide, N-vinylformamide, N-vinylpyrrolidone, and combinations thereof.

Other suitable monomers (c) that may be included are crosslinking agents, e.g., monomers having two or more ethylenically unsaturated double bonds in the monomer molecule, in order to facilitate crosslinking in the encapsulating polymeric material.

The group (a) monomers may be used alone or in combination with the monomers of groups (b) and/or (c) in the emulsion polymerization. Exemplary monomers of group (a) include, for example, methyl acrylate, ethyl acrylate, isopropyl acrylate, n-propyl acrylate, n-butyl acrylate, isobutyl acrylate, tert-butyl acrylate, secbutyl acrylate, pentyl acrylate, n-hexyl acrylate, octyl acrylate, 2-ethylhexyl acrylate, decyl acrylate, dodecyl acrylate, palmityl acrylate, stearyl acrylate, methyl methacrylate, ethyl methacrylate, isopropyl methacrylate, n-propyl methacrylate, n-butyl methacrylate, isobutyl methacrylate, sec-butyl methacrylate, tert-butyl methacrylate, pentyl methacrylate, n-hexyl methacrylate, cyclohexyl methacrylate, heptyl methacrylate, 2-ethylhexyl methacrylate, octyl methacrylate, decyl methacrylate, dodecyl methacrylate, palmityl methacrylate and stearyl methacrylate and vinyl acetate, vinyl propionate, vinyl butyrate, styrene, chlorostyrene, α-methylstyrene, and combinations thereof. Methyl methacrylate and styrene are preferred monomer species of group (a).

The monomers of group (b) may provide for the hydrophilic modification of the polymers. Suitable group (b) monomers include, for example, ethylenically unsaturated $C_3$- to $C_6$-carboxylic acids, vinyl sulfonic acid, 2-acrylamido-2-methyl propanesulfonic acid, sulfopropyl acrylate, sulfopropyl methacrylate, styrenesulfonic acid, salts of said acids, acrylonitrile, methacrylonitrile, $C_1$- to $C_8$-hydroxyalkyl esters of $C_1$- to $C_6$-carboxylic acids, di-$C_1$- to $C_3$-alkylamino-$C_2$- to $C_4$-alkyl acrylates, di-$C_1$- to $C_3$-alkylamino-$C_2$- to $C_4$-alkyl methacrylates, acrylamide, methacrylamide, N-vinylformamide, N-vinylpyrrolidone, and combinations thereof.

Examples of ethylenically unsaturated carboxylic acid monomers of group (b) include, for example, acrylic acid, methacrylic acid, crotonic acid, maleic acid, fumaric acid, itaconic acid, vinylacetic acid, and combinations thereof. The ethylenically unsaturated carboxylic acids and the monomers comprising sulfo groups can be used in the polymerization in their free acid form or in their partly or fully neutralized form. Neutralization may be effected with alkaline metal bases, alkaline earth metal bases, ammonias and/or amines. Sodium, potassium, and ammonium salts of the acidic monomers are preferably used. The acidic monomers can, however, also be neutralized with amines, such as butylamine, morpholine, ethanolamine, diethanolamine and triethanolamine, and may be partly or completely neutralized. Among the hydroxyalkyl esters that may be used as monomers of group (b), 2-hydroxyethyl acrylate, 2-hydroxyethyl methacrylate, hydroxypropyl acrylate, hydroxybutyl acrylate and 2-hydroxypropyl methacrylate are preferred.

Examples of basic monomers that can be used include, for example, dimethylaminoethyl acrylate, dimethylaminoethyl methacrylate, dimethylaminopropyl acrylate, dimethylaminopropyl methacrylate, diethylaminoethyl acrylate, diethylaminoethyl methacrylate, di-n-propyl aminoethyl acrylate, di-n-propylaminoethyl methacrylate, and combinations thereof. The basic monomers can be used in the polymerization as a free base, as a salt with mineral acids, saturated carboxylic acids or sulfonic acids, such as p-toluenesulfonic acid or benzenesulfonic acid, and in quaternized form, (e.g. quaternized with methyl chloride, ethyl chloride, n-propyl chloride, dimethyl sulfate, n-hexyl chloride, cyclohexyl chloride or benzyl chloride).

The monomers of group (b) can be used individually or in combination in the polymerization. Preferably, acrylic acid, methacrylic acid, acrylamide, methacrylamide, vinylformamide and N-vinylpyrrolidone are used from this group.

The group (c) monomers are crosslinking monomers, such those having two or more ethylenically unsaturated double bonds in the monomer molecule. Suitable multifunctional monomers include ethylenically unsaturated monomers such as divinyl monomers, trivinyl monomers, diacrylate monomers and triacrylate monomers.

Examples of group (c) monomers, include, for example, esters of polyhydric alcohols and ethylenically unsaturated carboxylic acids, (e.g., acrylic acid and methacrylic acid). Exemplary monomers include, for example, ethylene glycol diacrylate, ethylene glycol dimethacrylate, butanediol diacrylate, butanediol dimethacrylate, hexanediol diacrylate, hexanediol dimethacrylate, acrylates and methacrylates of polyalkylene glycols (e.g., polyethylene glycols, polypropylene glycols, block copolymers of ethylene oxide and propylene oxide having molar masses of, for example, from 100 to 5000, allyl acrylate, allyl methacrylate, trimethylolpropane triacrylate, trimethylolpropane trimethacrylate, pentaerythrityl triacrylate, pentaerythrityl trimethacrylate, pentaerythrityl tetraacrylate, pentaerythrityl tetramethacrylate, divinylbenzene, divinylurea. Methylenebisacrylamide, and combinations thereof. Allyl methacrylate, butanediol 1,4-diacrylate and trimethylolpropane triacrylate are preferred as crosslinking monomers.

Surfactants

Examples of suitable monomeric anionic surfactants that may be included in the emulsion polymerization mediums described herein, include, but are not limited to: sodium lauryl sulfate, sodium dodecyl sulfate, sodium hexadecyl sulfate, sodium dioctyl sulfosuccinate and/or adducts of from 15 to 50 mol. of ethylene oxide and/or propylene oxide and 1 mol. of a $C_{12}$- to $C_{22}$-alcohol, and combinations thereof.

Examples of suitable polymeric anionic surfactants include, for example: amphiphilic polymers, which are copolymers comprising units of (i) hydrophobic monoethylenically unsaturated monomers and (ii) monoethylenically unsaturated carboxylic acids, monoethylenically unsaturated sulfonic acids, monoethylenically unsaturated phosphonic acids or mixtures thereof and/or basic monomers. Combinations of polymeric anionic surfactants may be used.

Examples of suitable hydrophobic monoethylenically unsaturated monomers of (i) include, for example: styrene, methylstyrene, ethylstyrene, acrylonitrile, methacrylonitrile, $C_2$- to $C_{18}$-olefins, esters of monoethylenically unsaturated $C_3$- to $C_5$-carboxylic acids, and polyhydric alcohols, vinyl alkyl ethers, vinyl esters, and combinations thereof. Preferred from among this monomer group are isobutene, diisobutene, styrene and acrylates such as ethyl acrylate, isopropyl acrylate, n-butyl acrylate and sec-butyl acrylate.

Examples of suitable amphiphilic copolymers of (ii) include, for example: acrylic acid, methacrylic acid, maleic acid, maleic anhydride, itaconic acid, vinyl sulfonic acid, 2-acrylamidomethylpropanesulfonic acid, acrylamidopropane-3-sulfonic acid, 3-sulfopropyl acrylate, 3-sulfopropyl methacrylate, styrenesulfonic acid, vinylphosphonic acid, and combinations thereof, incorporated in the form of polymerized units. The acidic monomers can be present in the form of the free acids or in partly or completely neutralized form.

Further suitable hydrophilic monomers include basic monomers. They can be polymerized with the hydrophobic monomers (i) alone or in a combination with the abovementioned acidic monomers. If combinations of basic acidic monomers are employed in the emulsion polymerization, amphoteric copolymers which, depending on the molar ratio of acidic to basic monomers incorporated in the form of polymerized units, are anionically or cationically charged.

Suitable basic monomers include, for example, di-$C_1$- to $C_2$-alkylamino-$C_2$- to $C_4$-alkyl (meth)acrylates or diallyldimethylammonium chloride. The basic monomers can be present in the form of the free bases, of salts of organic or inorganic acids, or quaternized with alkyl halides. The basic monomers are cationic with salt formation or quaternization, which can be effected partially or completely. Examples of such compounds are dimethylaminoethyl methacrylate, diethylaminoethyl methacrylate, dimethylaminoethyl acrylate, diethylaminoethyl acrylate, dimethylaminopropyl methacrylate, dimethylaminopropyl acrylate, diethylaminopropyl methacrylate, diethylaminopropyl acrylate and/or dimethylaminoethyl acrylamide, dimethylaminoethyl methacrylamide, dimethylaminopropyl acrylamide, dimethylaminopropyl methacrylamide, diallyldimethylammonium chloride, and combinations thereof.

Amphiphilic copolymer surfactants may be employed in the emulsion polymerization. Amphiphilic copolymer surfactants may be in the form of water-soluble salts, which can improve the solubility of such surfactants compared to their free acid forms. For example, the corresponding alkali metal, alkaline earth metal and ammonium salts of these surfactants may be used. The salts may be prepared, for example, by neutralizing with bases to partially or completely neutralize the free acid groups of the amphiphilic copolymers. Neutralization can be effected with, for example, sodium hydroxide solution, potassium hydroxide solution, magnesium oxide, ammonia, and amines. Amines include, for example, triethanolamine, ethanolamine, morpholine, triethylamine and butylamine. Preferably, the acid groups of the amphiphilic copolymers are neutralized with ammonia or sodium hydroxide solution. The water solubility of basic monomers or of copolymers which comprise polymerized units of such monomers may also be increased by partial or complete neutralization with a mineral acid, such as hydrochloric acid or sulfuric acid, or by addition of an organic acid, such as acetic acid or p-toluenesulfonic acid. The weight average molecular weight of the amphiphilic copolymers is, for example, 1000 to 100,000 Daltons and is preferably in the range of 1500 to 10,000. The amphiphilic copolymers may have acid numbers of, for example, 50 to 500 mg KOH/g, preferably from 150 to 350 mg KOH/g of polymer.

Particularly preferred amphiphilic copolymer surfactants are those which comprise (i) from 95 to 45% by weight of isobutene, diisobutene, styrene, and combinations thereof; and (ii) from 5 to 55% by weight of acrylic acid, methacrylic acid, maleic acid, monoesters of maleic acid and combinations thereof, incorporated in the form of polymerized units.

Copolymer surfactants that comprise (i) from 45 to 80% by weight of styrene; (ii) from 55 to 20% by weight of acrylic acid and, if appropriate, (iii) additional monomers are preferably used as a stabilizer for the emulsion The copolymer surfactants may comprise, for example, as additional monomers (iii), monoester units of maleic acid incorporated in the form of polymerized units Such copolymer surfactants can be obtained, for example, by copolymerizing copolymers from monomers such as styrene, diisobutene, isobutene, and combinations thereof with maleic anhydride in the absence of water and treating the copolymers with alcohols after polymerization. In this procedure, preferably 5 to 50 mol % of a monohydric alcohol is used per mole of anhydride groups in the copolymer. Suitable alcohols include, for example, methanol, ethanol, n-propanol, isopropanol, n-butanol, isobutanol and tert-butanol. Further, the anhydride groups of the copolymers may be reacted with polyhydric alcohols, such as glycol or glycerol for example. Preferably, the reaction is continued until only one —OH group of polyhydric alcohol reacts with the anhydride group.

Cationic surfactants may be used together with anionic surfactants. Cationic surfactants include, for example, behenamidopropyl dimethylamine behenate, behenamidopropyl dimethylamine lactate, cocamidopropyl dimethylamine dihydroxymethylpropionate, coamidopropyl dimethylamine lactate, cocamidopropyl dimethylamine propionate, coamidopropyl morpholine lactate, isostearamidopropyl dimethylamine gluconate, isostearamidopropyl dimethylamine, glycolate, isostearamidpropyl dimethylamine lactate, lauramidopropyl dimethylamine propionate, linoleamidopropyl dimethylaimine dimmer dilinoleate, oleamidopropyl dimethylaimine glycolate, oleamidopropyl dimethylamine lactate, olemidopropyl dimethylamine propionate, olivamidopropyl dimethylamine lactate, palmitamidopropyl dimethylamine lactate, palmitamidopropyl dimethylamine propionate, palmitoleamidopropyl dimethylamine lactate, palmitoleamidopropyl dimethylamine propionate, ricinoleamidopropyl dimethylamine lactate, stearamidoethyl diethylamine phosphate, stearamidoethyl ethanolamine phosphate, stearamidopropyl dimethylamine lactate, stearamidopropyl dimethylamine stearate, sunflower seed amidopropyl dimethylamine lactate, sunflower seed amidopropyl dimethylamine malate, sunflower seed amidopropyl morpholine lactate, wheat germamidopropyl dimethylamine lactate, decarboxycamosine HCl, and stearamidopropyl morpholine lactate, and combinations thereof.

Nonionic surfactants may be used in the encapsulation of the materials in the emulsion polymerization method described herein. Suitable non-ionic surfactants include, for example: alkyl aryl ether alcohols based on octyl and nonyl phenol; alkyl aryl polyether alcohols based on octyl and nonyl phenol; alkyl phenol ethoxylates; fatty alcohol ethoxylates; ethylene oxide/propylene oxide copolymers; fatty acid ethoxylates; fatty acid ethylene oxide/propylene oxide copolymers; alkanol amides and ethoxylates; sorbitan esters and ethoxylates; and combinations thereof.

Polymerization Initiators

One or more free radical initiators may be included in the emulsion polymerization medium to effect a free radical polymerization reaction among the ethylenically unsaturated monomers that form the encapsulating polymeric material (e.g., the fluorescent dye materials). Many different free radical initiators may be used. Preferably, the free radical initiators are soluble in the aqueous phase. Examples of free radical initiators include, for example, persulfates (e.g., ammonium persulfate, sodium persulfate, and potassium persulfate). Oil-soluble initiators may also be employed either alone or in addition to the water soluble initiators. Oil-soluble initiators include, for example, organic peroxides such as benzoyl peroxide, t-butyl hydroperoxide and t-butyl perbenzoate. Azo compounds such as azobisisobutyronitrile may also be used. A number of different redox initiators may also be employed. Examples of redox initiators include, for example, (iron/hydrogen peroxide, isoascorbic acid/hydrogen peroxide, and sodium formaldehyde sulfoxalate.

The following advantages are attained from the encapsulated materials and the method for making same that is described herein:

The inventive procedure for dye encapsulation does not require the preparation of a miniemulsion prior to polymerization, and does not require the use of specialized equipment such as an ultrasonic homogenizer or a high speed stirrer;

Preferably only one solvent in addition to water is employed to dissolve dyes having poor solubility in the monomers and poor solubility in water, and to aid in dispersing the dyes in the aqueous dispersion;

No dye precipitation, or only minimal dye precipitation, takes place after synthesizing the polymer-encapsulated dyes in the emulsions, and little to no coagulum forms after polymerization. Dyes that are not soluble in certain monomers employed in emulsion polymerization can be encapsulated. For example, pigment blue 79 is a dye that is not soluble in monomers such styrene, yet it can be made soluble by providing a mixture of this dye with one or more solvents such as DMSO and 1-vinyl-2-pyrrolidinone.

Figure 1:
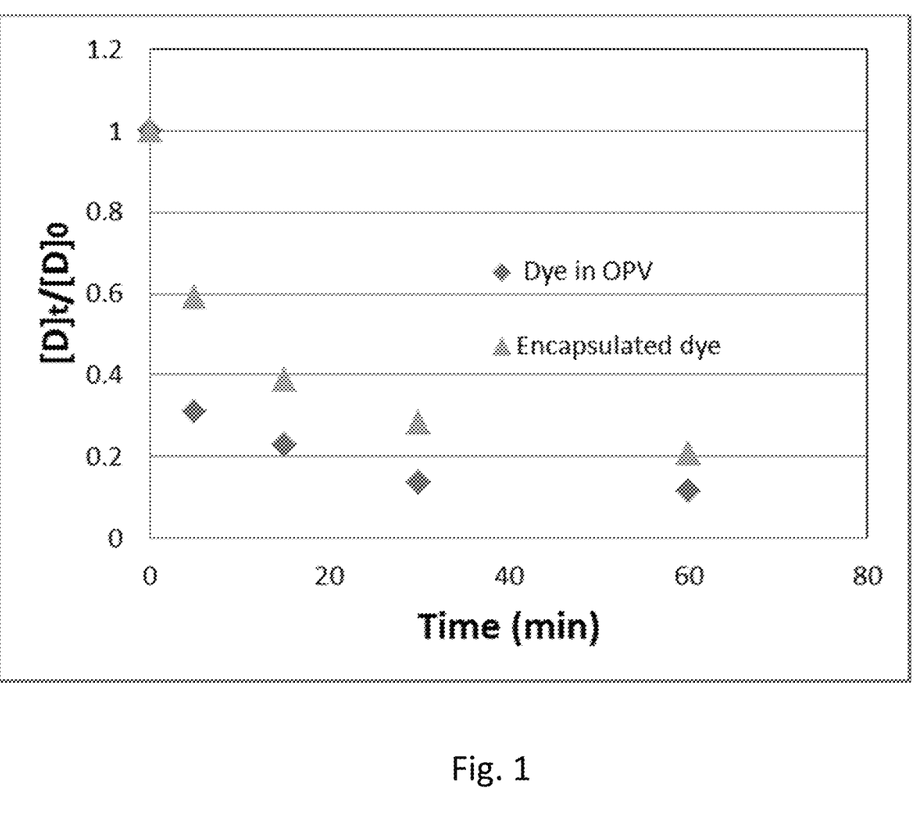
FIG. 1 is a plot showing the degradation curves for Pigment blue 79 encapsulated with crosslinked polystyrene and pigment blue 79 mixed with overprint varnish (OPV).

Encapsulated dyes made by the present method show improved lightfastness compared to free dyes mixed with/dispersed into the water based emulsion, per FIG. 1, which shows that pigment blue 79 encapsulated in crosslinked PS has better lightfastness than the free pigment blue 79 mixed with OPV. In testing, most of the free dye decayed within the first 5 mins. About 70% of the free Pigment Blue 79 in OPV was degraded after exposing in the light box for 5 minutes, while the encapsulated Pigment Blue 79 still has about 60% remaining intact.

With the exception of the comparative examples, examples of emulsions in which materials are encapsulated in accordance with the present disclosure and a showing of properties possessed by same now follow. It is to be understood that these examples are not intended to limit the scope of the disclosure to the explicit descriptions of the exemplary compositions and methods, and they should not be construed in a limiting manner.

EXAMPLES

Comparative Example 1

A dye emulsion was prepared in which a free radical polymerization reaction took place in accordance with Example 21 of U.S. Pat. No. 7,176,255, described at Cols. 50-55 thereof. As part of the preparation process, a miniemulsion was prepared from the aqueous emulsifier solution of Example 21 (See Table 1) using an ultrasound source. Lumogen® F Red 300, a dye available from BASF, was encapsulated within a polymer prepared from acrylate and vinyl monomers. In particular, 201.5 g water;

2.0 g sodium lauryl sulfate (SLS);
0.5 g Lumogen® F Red 300;
2.5 g stearyl acrylate;
47.5 g styrene; and
1.0 g divinyl benzene were mixed in a glass jar with a magnetic stir bar. The mixture was subjected to ultrasonication using a Branson sonifier 450. Most of the red dye (1% dye to polymer ratio) was dispersed into the monomer miniemulsion. No dye precipitate was observed in the jar and on the magnetic stir bar.

Polymerization then took place in the monomer miniemulsion following the procedure described in part IV set forth in col. 50 of the '255 patent, using the aqueous initiator solution of sodium peroxodisulfate in the concentration set forth in table 1 of the '255 patent. The obtained Lumogen® F Red 300 encapsulated emulsion included a small amount of polymer and dye precipitate (dye plus polymer precipitates about 5%). The measured solid content was 20 wt %, comparable to the amount of 17.6 wt % reported in the '255 patent. Measured particle size in the emulsion was 100 nm, comparable to the 152 nm particle size reported in the '255 patent.

All amounts in Tables 1-9 below are in grams, unless otherwise indicated.

Example 1

TABLE 1

| | | |
|---|---|---|
| 1167.98 | A | Joncryl 678 |
| 449.22 | B | Ammonium Hydroxide 28% |
| 4941.45 | C | Deionized Water (DI water) |
| 17.97 | D | Sodium bicarbonate |
| 4.79 | E | Lumogen ® F Red 300 |
| 179.69 | F | N-vinyl pyrrolidone |
| 215.63 | G | Pluronic L61 |
| 8.98 | H | Ammonium persulfate |
| 59.90 | I | DI Water |
| 2740.26 | J | Styrene |
| 149.74 | K | Divinyl benzene |
| 4.49 | L | Ammonium persulfate |
| 59.90 | M | DI Water |
| 10000.00 | | Total |

(A+B+C+D) were charged to a 1 L 4-neck flask and heated to 60° C. while purging $N_2$ with mixing at 300 rpm for 30 minutes until all the resin was dissolved. Dye and N-vinyl pyrrolidone solution (E+F) were charged to the flask and the flask was heated to 80° C. for 5 minutes while mixing with a stainless steel agitator. Non-ionic surfactant (G) was then charged to the flask. 10 minutes later, ammonium persulfate (initiator) and water (H+I) were added to the flask. After 5 minutes, styrene monomer (J) was added into the flask by addition funnel over a period of 1.5 hours. 10 minutes later, crosslinking monomer (K) was charged to the flask over 15 minutes followed by adding additional initiator solution (L+M). The mixture was held for 4 hours, producing an emulsion including Lumogen® F Red 300 encapsulated in polymer. The encapsulated dye had a red color. There was no dye precipitate and polymer coagulum formed in the emulsion.

In Example 1, Lumogen® F Red 300 was encapsulated in a polystyrene (PS) emulsion using the method of the present application at a dye to polymer ratio of 0.1 wt % (vs. BASF's 1.0 wt %) The actual dye to emulsion ratio was 0.044 wt % (vs. '255 patent's 0.20 wt %).

The polymerized emulsion does not contain dye precipitate or polymer coagulum, and the encapsulated dye particles remain stable over time.

Comparative Example 2—Encapsulated Pigment Blue 79 Dye

Preparation of Monomer Miniemulsion:

Using the procedures described above in the discussion of Comparative Example 1, the following materials were mixed in a glass jar:
  201.5 g water;
  2.0 g SLS; 0.125 g pigment blue 79 dye;
  2.5 g stearyl acrylate;
  47.5 g styrene; and
  1.0 g divinyl benzene.

The mixture was subjected to ultrasonification as set forth in Comparative Example 1. It appears that pigment blue 79 is poorly soluble in the styrene monomer, as the pigment blue 79 dye did not dissolve into the monomer miniemulsion and floated to the top of the miniemulsion mixture. Further, a small amount of pigment blue 79 dye precipitate was observed on the magnetic stir bar.

The monomer miniemulsion was then polymerized following the procedure described in part IV set forth in col. 50 of the '255 patent, as described above in Comparative Example 1. After polymerization of the monomers, the polymerization emulsion contained polymer-encapsulated pigment blue 79 and dye precipitate. Some polymer coagulum (about 5 wt % as determined from the measured solids amount) was formed and pigment blue 79 dye precipitated onto the agitator, the temperature probe, and in the emulsion after the polymerization.

The measured solid content of the emulsion of Comparative Example 2 was 18.5 wt %, and the measured particle size was 196 nm (as determined using a vacuum oven at 120° C. to evaporate the solvent).

Comparative Example 2 demonstrates that the miniemulsion including encapsulation process of the '255 patent is not well suited for dyes having poor solubility in certain monomers due to dye precipitation formed after the polymerization.

The '255 patent method appears to require that the fluorescent dyes have good solubility in ethylenically unsaturated monomer such as styrene. This limits the amount of dye that can be encapsulated. However, the present application does not require the dyes to be soluble in monomers—they were solubilized first in a solvent (which may be a polymerizable solvent).

In the '255 patent method, a certain amount of polymer coagulum forms after the polymerization. In other words, the encapsulated dye emulsion is not stable. The encapsulated dye emulsion process of the present invention on the other hand produces stable emulsions.

Example 2

Pigment blue 79 dye was encapsulated as follows, at the same concentration employed in Comparative Example 2.

Pigment blue 79 was encapsulated in a polystyrene (PS) emulsion using the method of the present application at a dye to polymer ratio of 0.1 wt % (vs. '255 patent's 0.25 wt %). The actual dye to emulsion ratio was 0.044 wt % (vs. '255 patent's 0.05 wt %). The emulsion containing the polymer-encapsulated pigment blue 79 encapsulated contains no dye precipitate in the vessel, on the agitator, and on the temperature probe.

With almost the same dye to emulsion ratio (0.044% vs. 0.050%), the present inventive method shows much less dye precipitation, resulting in the produced emulsion having a darker color and much stronger fluorescent intensity.

In practicing the method described herein, the pigment blue 79 dye was polymer encapsulated, with less polymer and dye precipitation and with a stronger dye fluorescence signal than was attained in the method of Comparative Example 2.

Example 2

Preparation of Encapsulated Pigment Blue 79 Cross-Linked Polystyrene (PS) Emulsion Using Joncryl 678 as an Anionic Polymeric Surfactant.

TABLE 2

| | | |
|---|---|---|
| 1167.98 | A | Joncryl 678 |
| 449.22 | B | Ammonium Hydroxide 28% |
| 4941.45 | C | Deionized Water (DI water) |
| 17.97 | D | Sodium bicarbonate |
| 4.79 | E | Pigment blue 79 dye |

TABLE 2-continued

| | | |
|---|---|---|
| 179.69 | F | N-vinyl pyrrolidone |
| 215.63 | G | Pluronic L61 |
| 8.99 | H | Ammonium persulfate |
| 59.90 | I | DI Water |
| 2740.26 | J | Styrene |
| 149.74 | K | Divinyl benzene |
| 4.49 | L | Ammonium persulfate |
| 59.90 | M | DI Water |
| 10000.00 | | Total |

Ammonium hydroxide neutralizes the Joncryl 678 resin, helping it dissolve in water and facilitating its surfactant properties. Sodium bicarbonate is used as a buffer in the emulsion polymerization medium.

(A+B+C+D) were charged to a 1 L 4-neck flask and heated to 60° C. while purging $N_2$ with mixing at 300 rpm for 30 minutes until all the resin was dissolved. Dye and vinyl pyrrolidone solution (E+F) were charged to the flask and the flask was heated to 80° C. for 5 minutes while mixing with a stainless steel agitator. Non-ionic surfactant (G) was then charged to the flask. 10 minutes later, ammonium persulfate (initiator) and water (H+I) were added to the flask. After 5 minutes, styrene monomer (J) was added into the flask by addition funnel over a period of 1.5 hours. 10 minutes later, crosslinking monomer (K) was charged to the flask over 15 minutes followed by adding additional initiator solution (L+M). The mixture was held for 4 hours, producing an emulsion including pigment blue 79 encapsulated in polymer. The encapsulated dye had a light blue color. There was no dye precipitate and polymer coagulum formed in the emulsion.

Example 3

Preparation of Encapsulated Pigment Blue 79 Dye in Poly(Styrene-Butyl Acrylate-Acrylic Acid) (P(St-BA-AA)) Emulsion Using Sodium Lauryl Sulfate (SLS), a Monomeric Surfactant.

TABLE 3

| | | |
|---|---|---|
| 87.42 | A | Sodium Lauryl Sulfate |
| 5536.61 | B | DI Water |
| 17.48 | C | Sodium bicarbonate |
| 4.66 | D | Pigment blue 79 dye |
| 174.84 | E | N-vinyl pyrrolidone |
| 209.81 | F | Pluronic L-61 |
| 25.06 | G | Ammonium Persulfate |
| 58.28 | H | DI Water |
| 1427.86 | I | Styrene |
| 2243.79 | J | Butyl Acrylate |
| 151.53 | K | Acrylic acid |
| 4.37 | L | Ammonium Persulfate |
| 58.28 | M | DI Water |
| 9999.99 | | Total |

(A+B+C) were charged to a 1 L 4-neck flask and heated to 60° C. while purging $N_2$ with mixing at 300 rpm for 30 minutes. Dye and N-vinyl pyrrolidone solution (D+E) were charged to the flask and the flask was heated to 80° C. for 5 minutes. Non-ionic surfactant (F) was charged to the flask. 10 minutes later, ammonium persulfate-water solution (G+H) was added to the flask. After 5 minutes, monomer mixture (I+J+K) was charged to the flask by addition funnel over a period of 1.5 hours. 15 minutes later, additional initiator solution (L+M) was charged to the flask and held for 4 hours, thereby producing an emulsion including pigment blue 79 encapsulated in polymer. The dye had a light blue color. The emulsion contained some dye precipitate, and polymer coagulum was observed on the shaft of the agitator and temperature probe.

Example 4

Preparation of Encapsulated Pigment Blue 79 in Poly (Methyl Methacrylate-Ethylhexyl Acrylate) P(MMA-EHA) in an Emulsion Using Joncryl 678 as Surfactant.

TABLE 4

| | | |
|---|---|---|
| 1185.74 | A | Joncryl 678 |
| 456.05 | B | Ammonium Hydroxide 28% |
| 5016.57 | C | DI Water |
| 18.24 | D | Sodium bicarbonate |
| 4.86 | E | Pigment blue 79 dye |
| 182.42 | F | N-vinyl pyrrolidone |
| 218.90 | G | Pluronic L61 |
| 9.12 | H | Ammonium persulfate |
| 60.81 | I | DI Water |
| 1185.74 | J | Methyl methacrylate |
| 1596.18 | K | ethylhexyl acrylate |
| 4.56 | L | Ammonium persulfate |
| 60.81 | M | DI Water |
| 10000.00 | | Total |

(A+B+C+D) were charged to a 1 L 4-neck flask and heated to 60° C. while purging $N_2$ with mixing at 300 rpm for 30 minutes until all the resin was dissolved. The dye and N-vinyl pyrrolidone solution (E+F) were then charged to the flask and the flask was heated to 80° C. for 5 minutes. Non-ionic surfactant (G) was then charged to the flask. 10 minutes later, ammonium persulfate-water solution (H+I) was charged to the flask. After 5 minutes, the monomer mixture (J+K) was charged to the flask by addition funnel over a period of 1.5 hours. 15 minutes later, additional initiator solution (L+M) was charged to the flask and the mixture was held for 4 hours, thereby producing an emulsion including pigment blue 79 encapsulated in polymer. The dye had a dark blue color. The emulsion did not contain dye precipitate and polymer coagulum.

Example 5

Preparation of Pigment Paliogen Black 50084 Encapsulated Non-Cross-Linked PS Emulsion.

TABLE 5

| | | |
|---|---|---|
| 1185.73 | A | Joncryl 678 |
| 456.05 | B | Ammonium Hydroxide 28% |
| 5016.57 | C | DI Water |
| 18.24 | D | Sodium bicarbonate |
| 4.86 | E | Paliogen black S0084 |
| 182.42 | F | N-vinyl pyrrolidone |
| 218.90 | G | Pluronic L61 |
| 9.12 | H | Ammonium persulfate |
| 60.81 | I | DI Water |
| 2781.92 | J | Styrene |
| 4.56 | K | Ammonium persulfate |
| 60.81 | L | DI Water |
| 10000.00 | | Total |

(A+B+C+D) were charged to a 1 L 4-neck flask and heated to 60° C. while purging $N_2$ with mixing at 300 rpm for 30 minutes until all the resin was dissolved. The pigment and N-vinyl pyrrolidone solution (E+F) were then charged to the flask and the flask was heated to 80° C. for 5 minutes.

Non-ionic surfactant (G) was then charged to the flask. After 10 minutes, ammonium persulfate-water solution (H+I) was added to the flask. After 5 minutes, styrene monomer (J) was charged to the flask by addition funnel over a period of 1.5 hours. 15 minutes later, additional initiator-water solution (K+L) was charged to the flask and the mixture was held for 4 hours, thereby producing an emulsion including Paliogen black 50084 encapsulated in polymer. The emulsion included some dye precipitate formed in the polymerization.

Example 6

Preparation of UFB403 Red Dye Encapsulated PS Emulsion Using Non-Polymerizable Ethyl Acetate as a Solvent for the Dye.

TABLE 6

| | | |
|---|---|---|
| 1200.33 | A | Joncryl 678 |
| 461.67 | B | Ammonium Hydroxide 28% |
| 5078.33 | C | DI Water |
| 18.47 | D | Sodium bicarbonate |
| 4.92 | E | UFB403 red dye |
| 61.56 | F | Ethyl acetate |
| 221.60 | G | Pluronic L61 |
| 9.23 | H | Ammonium persulfate |
| 61.56 | I | DI Water |
| 2816.16 | J | Styrene |
| 4.62 | K | Ammonium persulfate |
| 61.56 | L | DI Water |
| 10000.00 | | Total |

(A+B+C+D) were charged to a 1 L 4-neck flask and heated to 60° C. while purging $N_2$ with mixing at 300 rpm for 30 minutes until all the resin was dissolved. The dye and ethyl acetate solution (E+F) were then charged to the flask and the flask was heated to 80° C. for 5 minutes. Non-ionic surfactant (G) was then charged to the flask, and after 10 minutes, ammonium persulfate-water solution (H+I) were added to the flask. After 5 minutes, styrene monomer (J) was charged to the flask by addition funnel over a period of 1.5 hours. After 15 minutes, additional initiator solution (K+L) was charged to the flask and the mixture was held for 4 hours, thereby producing an emulsion including UFB403 red dye encapsulated in polymer. There was some dye precipitate in the emulsion that formed after polymerization.

Methods to Measure the Particle Size of the Emulsion by Dynamic Light Scattering (DLS):

The obtained emulsion was diluted 20 times by water. The particle size of diluted emulsion samples was measured three times by Horiba LB-500 Dynamic Light Scattering according to the Mie theory and the average value recorded.

Comparative Example X

Lumogen® F Red 300 was encapsulated by the process of the '255 patent which employs and uses a mini-emulsion process (about 19 wt % solids, 0.1 encapsulated dye to polymer ratio (w/w))

Preparation of Monomer Miniemulsion:

Using the procedures described above in the discussion of Comparative Example 1, the following materials were mixed in a glass jar with magnetic stir bar:

201.5 g water;
2.0 g SLS;
0.052 g Lumogen® F Red 300;
2.5 g stearyl acrylate;
47.5 g styrene; and
1.0 g divinyl benzene.

The mixture was subjected to ultrasonification as set forth in Comparative Example 1. No dye precipitate was observed in the jar and on the magnetic stir bar.

The monomer miniemulsion was then polymerized following the procedure described in part IV set forth in col. 50 of the '255 patent, as described above in Comparative Example 1. Some polymer coagulum (about 5 wt %) was formed and Lumogen® F Red 300 precipitated onto the agitator, the temperature probe, and in the emulsion after the polymerization.

The measured solid content of the emulsion of Comparative Example X was 18.4%.

Example X

Lumogen® F Red 300 Encapsulated Emulsion (about 40 wt % Solids) Via the Present Inventive Method (0.1 wt % Encapsulated Dye to Polymer Ratio (w/w)).

TABLE 7

| | | |
|---|---|---|
| 1064.85 | A | Joncryl 678 |
| 354.95 | B | Ammonium Hydroxide 28% |
| 4696.25 | C | Deionized Water (DI water) |
| 4.10 | D | Lumogen ® F Red 300 |
| 163.82 | E | N-vinyl pyrrolidone |
| 196.59 | F | Pluronic L61 |
| 32.76 | G | t-butyl hydroperoxide (70%) |
| 16.38 | H | Ascorbic Acid |
| 682.59 | I | DI water |
| 2498.29 | J | Styrene |
| 54.61 | K | Divinyl Benzene |
| 10.92 | L | t-butyl hydroperoxide (70%) |
| 5.46 | M | Ascorbic Acid |
| 218.43 | N | DI water |
| 10000.00 | | Total |

(A+B+C) were charged to a 1 L 4-neck flask and heated to 60° C. while purging $N_2$ with mixing at 300 rpm for 30 minutes until all the resin was dissolved. Dye and N-vinyl pyrrolidone solution (D+E) were charged to the flask for 5 minutes while mixing with a stainless steel agitator. Non-ionic surfactant (F) was then charged to the flask. 10 minutes later, t-butyl hydroperoxide (70%) (G) was charged to the flask and held for 10 min. Then 10% of ascorbic water solution (H+I) and styrene monomer (J) were added to the flask. After 15 minutes, the rest of (H+I) and (J) were added to the flask by addition funnel over a period of 1.5 hours. After adding the monomer (J), crosslinking monomer (K) was charged to the flask over 5 minutes followed by adding additional redox initiator solution (L)+(M+N) to the flask. The mixture was held for 3 hours, producing an emulsion including Lumogen® F Red 300 encapsulated in polymer. There was no dye precipitate and polymer coagulum formed in the emulsion.

The measured solid content of the emulsion of Example X was 39.4%.

Comparative Example Y

UFB 403 red dye was encapsulated by the process of the '255 patent which employs and uses a mini-emulsion (about 19 wt % solids, 0.1 encapsulated dye to polymer ratio (w/w)).

Preparation of Monomer Miniemulsion:

Using the procedures described above in the discussion of Comparative Example 1, the following materials were mixed in a glass jar with magnetic stir bar:

201.5 g water;
2.0 g SLS;
0.052 g UFB 403 red dye;
2.5 g stearyl acrylate;
47.5 g styrene; and
1.0 g divinyl benzene.

The mixture was subjected to ultrasonification as set forth in Comparative Example 1. No dye precipitate was observed in the jar and on the magnetic stir bar.

The monomer miniemulsion was then polymerized following the procedure described in part IV set forth in col. 50 of the '255 patent, as described above in Comparative Example 1. Some polymer coagulum (about 5 wt %) was formed UFB 403 red dye precipitated onto the agitator, the temperature probe, and in the emulsion after the polymerization.

The measured solid content of the emulsion of Comparative Example Y was 18.4%.

Example Y

UFB 403 Red Dye Encapsulated Emulsion (about 40 wt % Solids) Via the Present Inventive Method (0.1 Encapsulated Dye to Polymer Ratio (w/w)).

TABLE 8

| | | |
|---|---|---|
| 1064.85 | A | Joncryl 678 |
| 354.95 | B | Ammonium Hydroxide 28% |
| 4696.25 | C | Deionized Water (DI water) |
| 4.10 | D | UFB 403 red dye |
| 163.82 | E | N-vinyl pyrrolidone |
| 196.59 | F | Pluronic L61 |
| 32.76 | G | t-butyl hydroperoxide (70%) |
| 16.38 | H | Ascorbic Acid |
| 682.59 | I | DI water |
| 2498.29 | J | Styrene |
| 54.61 | K | Divinyl Benzene |
| 10.92 | L | t-butyl hydroperoxide (70%) |
| 5.46 | M | Ascorbic Acid |
| 218.43 | | DI water |
| 10000.00 | | Total |

(A+B+C) were charged to a 1 L 4-neck flask and heated to 60° C. while purging $N_2$ with mixing at 300 rpm for 30 minutes until all the resin was dissolved. Dye and N-vinyl pyrrolidone solution (D+E) were charged to the flask for 5 minutes while mixing with a stainless steel agitator. Nonionic surfactant (F) was then charged to the flask. 10 minutes later, t-butyl hydroperoxide (70%) (G) was charged to the flask and held for 10 min. Then 10% of ascorbic water solution (H+I) and styrene monomer (J) were added to the flask. After 15 minutes, the remainder of (H+I) and (J) were added into the flask by addition funnel over a period of 1.5 hours. After adding the monomer (J), crosslinking monomer (K) was charged to the flask over 5 minutes followed by adding additional redox initiator solution (L)+(M+N) to the flask. The mixture was held for 3 hours, producing an emulsion including UFB 403 red dye encapsulated in polymer. There was no polymer coagulum formed in the emulsion, and some dye precipitate was observed at the bottom of the emulsion over time.

The measured solid content of the emulsion of Example Y was 40.1%.

Comparative Example Z

Pigment blue 79 dye was encapsulated by the process of the '255 patent which employs and uses a mini-emulsion (about 19 wt % solids, 0.1 encapsulated dye to polymer ratio (w/w)).

Preparation of Monomer Miniemulsion:

Using the procedures described above in the discussion of Comparative Example 1, the following materials were mixed in a glass jar with magnetic stir bar:
201.5 g water;
2.0 g SLS;
0.052 g Pigment blue 79 dye;
2.5 g stearyl acrylate;
47.5 g styrene; and
1.0 g divinyl benzene.

The mixture was subjected to ultrasonification as set forth in Comparative Example 1. No dye precipitate was observed in the jar and on the magnetic stir bar.

The monomer miniemulsion was then polymerized following the procedure described in part IV set forth in col. 50 of the '255 patent, as described above in Comparative Example 1. Some polymer coagulum was formed Pigment blue 79 dye precipitated onto the agitator, the temperature probe, and in the emulsion after the polymerization. Not all the monomers were polymerized.

The measured solid content of the emulsion of Comparative Example Z was 8.0%.

Example Z

Pigment Blue 79 Dye Encapsulated Emulsion Via the Present Inventive Method (about 40 wt % Solids, 0.1 Encapsulated Dye to Polymer Ratio (w/w)).

TABLE 9

| | | |
|---|---|---|
| 1064.85 | A | Joncryl 678 |
| 354.95 | B | Ammonium Hydroxide 28% |
| 4696.25 | C | Deionized Water (DI water) |
| 4.10 | D | Pigment blue 79 dye |
| 163.82 | E | N-vinyl pyrrolidone |
| 196.59 | F | Pluronic L61 |
| 32.76 | G | t-butyl hydroperoxide (70%) |
| 16.38 | H | Ascorbic Acid |
| 682.59 | I | DI water |
| 2498.29 | J | Styrene |
| 54.61 | K | Divinyl Benzene |
| 10.92 | L | t-butyl hydroperoxide (70%) |
| 5.46 | M | Ascorbic Acid |
| 218.43 | | DI water |
| 10000.00 | | Total |

(A+B+C) were charged to a 1 L 4-neck flask and heated to 60° C. while purging $N_2$ with mixing at 300 rpm for 30 minutes until all the resin was dissolved. Dye and N-vinyl pyrrolidone solution (D+E) were charged to the flask for 5 minutes while mixing with a stainless steel agitator. Nonionic surfactant (F) was then charged to the flask. 10 minutes later, t-butyl hydroperoxide (70%) (G) was charged to the flask and held for 10 min. Then 10% of ascorbic water solution (H+I) and styrene monomer (J) were added to the flask. After 15 minutes, the rest of (H+I) and (J) were added into the flask by addition funnel over a period of 1.5 hours. After adding the monomer (J), crosslinking monomer (K) was charged to the flask over 5 minutes followed by adding additional redox initiator solution (L)+(M+N) to the flask. The mixture was held for 3 hours, producing an emulsion including Pigment blue 79 dye encapsulated in polymer. There was no polymer coagulum formed in the emulsion. A small amount of Pigment blue 79 dye precipitated at the bottom of the emulsion over time.

The measured solid content of the emulsion of Example Z was 39.3 wt %.

Example 10: Measurement of Relative Intensities

In addition to preparing emulsion of the polymer-encapsulated dyes of Examples X, Y, and Z and Comparative Examples X, Y, and Z using Lumogen® F Red 300, USF403, and pigment blue 79, each at a 0.1 dye/polymer ratio (w/w) and 0.02 wt % dye/total emulsion dispersion ratio, a solution of each dye was prepared in N-methyl pyrrolidone (NMP) solvent at a concentration of 0.02 wt % dye in NMP. The NMP solutions were used as references in generating emission data.

Intensity measurements provided in the figures for the polymer-encapsulated light emitting dyes were determined with a fiber optic based spectrometer having of a Thorlabs CCS200 unit with an attached bifurcated fiber optic probe and the associated software. A 470 nm LED excitation source with SMA connector and a 5 mW 635 nm laser with SMA connector were used as excitation sources for producing emission spectra that were captured by the spectrometer software. For all measurements, an appropriate cut-off filter was used in front of the spectrometer to eliminate the majority of the excitation light from the measured spectra.

The fluorescence intensities for each of the polymer-encapsulated dyes in the emulsions of Examples X, Y, and Z and Comparative Examples X, Y, and Z were measured at the wavelength of the peak intensity of the solution of the dye in NMP. The relative fluorescence intensities of the polymer encapsulated dyes were determined by dividing the fluorescence intensity of each of Examples X, Y, and Z and Comparative Examples X, Y, and Z by the fluorescence intensity of the NMP solution for the appropriate dye. The results are shown in Table 10.

Figure 2:
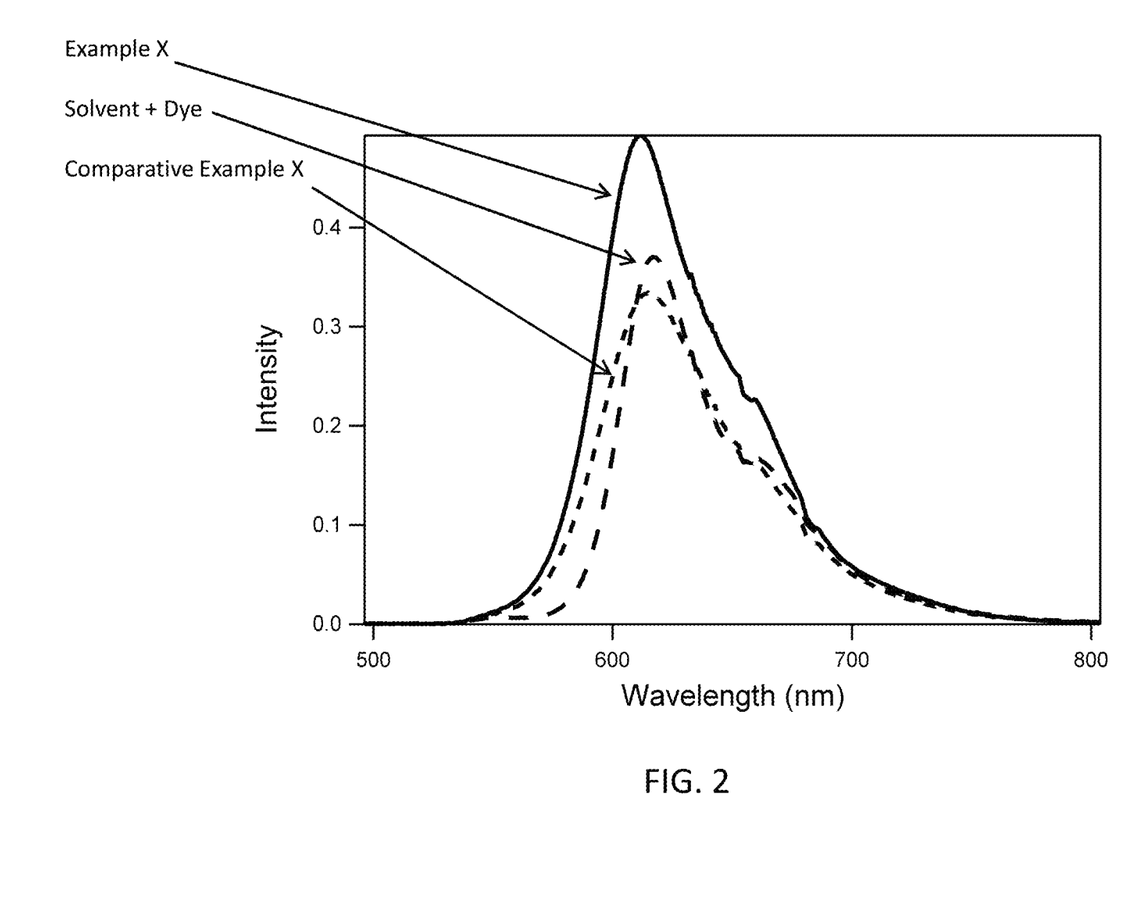
FIG. 2 is a plot of light intensity vs. wavelength for Lumogen® F Red 300 dye, encapsulated by the present inventive method and by the method of the '255 patent. Also shown in the plot is the light intensity vs. wavelength plot a solution of Lumogen® F Red 300 dye in NMP.

The plot shown in FIG. 2 shows the light intensity vs. wavelength for Lumogen® F Red 300 that was encapsulated by the present inventive method (Example X) and by the method of the '255 patent (Comparative Example X). Also shown in the plot is the light intensity vs. wavelength for a solution of Lumogen® F Red 300 in NMP (0.02 wt % dye in NMP) (dye+solvent, as identified in FIG. 2).

TABLE 10

Fluorescence intensities for encapsulated dyes relative to the values for each encapsulated dye in NMP.

| Dye | Present Method/ Encapsulated Dyes | '255 Patent Method/ Encapsulated Dyes |
| --- | --- | --- |
| Lumogen F Red 300 | 1.3 (Example X) | 0.90 (Comparative Example X) |
| USF403 | 0.68 (Example Y) | 0.58 (Comparative Example Y) |
| Pigment Blue 79 | 0.32 (Example Z) | 0.078 (Comparative Example Z) |

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An encapsulated light emitting material comprising:
a light emitting material and
a polymer material encapsulating the light emitting material, wherein the encapsulated light emitting material is produced by emulsion polymerization:
   i) in an emulsion polymerization medium formed from:
      a) a solution of the light emitting material in a water miscible solvent and
      b) an aqueous solution of surfactants;
   ii) in a process that does not employ a miniemulsion; and
wherein the encapsulated light emitting material exhibits an increased intensity of at least 5% over an encapsulated light emitting material produced in an emulsion polymerization that employs a miniemulsion procedure.

2. The encapsulated light emitting material of claim 1, wherein the light emitting material is selected from dyes and pigments.

3. The encapsulated light emitting material of claim 1, wherein the light emitting material is a fluorescent dye.

4. The encapsulated light emitting material of claim 1, wherein the polymer material is produced from one or more ethylenically unsaturated monomers.

5. The encapsulated light emitting material of claim 4, wherein at least a portion of the one or more ethylenically unsaturated monomers are monomers having two or more ethylenically unsaturated groups.

6. A method of providing a polymer-encapsulated material comprises the steps of:
   (a) dissolving one or more cationic or anionic surfactants, and possibly, one or more non-ionic surfactants, in water;
   (b) dissolving a material to be encapsulated in a polymerizable or non-polymerizable solvent or in a solvent blend comprised of two or more solvents;
   (c) combining (a) and (b) together with one or more non-ionic surfactants, if the non-ionic surfactants has not been added to (a), and mixing same;
   (d) adding one or more monomers polymerizable by free radical polymerization to the above-mixture; and
   (e) adding one or more initiators at any step of the process, and initiating a free radical polymerization reaction in the aqueous medium, wherein in an emulsion, the material of (b) is encapsulated in the polymer material that forms in the polymerization reaction wherein the process does not employ a miniemulsion.

7. The method of claim 6, wherein the one or more initiators are added after step (b) or before step (d).

8. The method of claim 6, wherein the polymer material is produced from one or more ethylenically unsaturated monomers.

9. The method of claim 8, wherein at least a portion of the one or more ethylenically unsaturated monomers are monomers having two or more ethylenically unsaturated groups.

10. The method of claim 9, wherein the polymer material is at least partially cross-linked.

11. The method of claim 6, wherein the material to be encapsulated is selected from pigments, dyes, optical brighteners, upconverters and downconverters.

12. The method of claim 6, wherein the material to be encapsulated is selected from pigments and dyes.

13. The method of claim 6, wherein the material to be encapsulated is selected from fluorescent dyes.

14. The method of claim 6, wherein the material of (b) is encapsulated within the polymer material, thereby forming particles having sizes of about 50 nm to about 500 nm.

15. The method of claim 6, wherein the emulsion contains about 5 wt % to about 70 wt % solid material.

16. The method of claim 15, wherein the material to be encapsulated is a dye, and the amount of dye to solid material on a weight basis is about 0.001% to 0.5%.

17. An encapsulated light emitting material comprising a light emitting material and a polymer material encapsulating the light emitting material, produced according to a method comprising the steps of:
  (a) dissolving one or more cationic or anionic surfactants, and possibly, one or more non-ionic surfactants, in water;
  (b) dissolving the light emitting material to be encapsulated in a water miscible solvent or in a solvent blend comprised of two or more solvents wherein the solvent blend comprises a water miscible solvent;
  (c) combining (a) and (b) together with one or more non-ionic surfactants, if the non-ionic surfactants has not been added to (a), and mixing same;
  (d) adding one or more monomers polymerizable by free radical polymerization to the above-mixture; and
  (e) adding one or more initiators at any step of the process, and initiating a free radical polymerization reaction in the aqueous medium, wherein in an emulsion, the material of (b) is encapsulated in the polymer material that forms in the polymerization reaction wherein the process does not employ a miniemulsion.

18. The encapsulated light emitting material of claim 17, wherein the light emitting material is selected from dyes and pigments.

19. The encapsulated light emitting material of claim 17, wherein the light emitting material is a fluorescent dye.

20. The encapsulated light emitting material of claim 17, wherein the encapsulated light emitting material exhibits an increased fluorescent intensity of at least 5% over an encapsulated light emitting material produced in an emulsion polymerization that employs a miniemulsion procedure.

\* \* \* \* \*